(12) United States Patent
Hua

(10) Patent No.: US 11,609,864 B2
(45) Date of Patent: Mar. 21, 2023

(54) BALANCED NETWORK AND METHOD

(71) Applicant: Wensheng Hua, Fremont, CA (US)

(72) Inventor: Wensheng Hua, Fremont, CA (US)

(*) Notice: Subject to any disclaimer, the term of this patent is extended or adjusted under 35 U.S.C. 154(b) by 0 days.

(21) Appl. No.: 17/322,703

(22) Filed: May 17, 2021

(65) Prior Publication Data
US 2021/0271609 A1 Sep. 2, 2021

Related U.S. Application Data

(63) Continuation of application No. 16/859,833, filed on Apr. 27, 2020, now Pat. No. 11,036,655, which is a
(Continued)

(51) Int. Cl.
| | | |
|---|---|---|
| G06F 13/00 | (2006.01) | |
| H04L 67/06 | (2022.01) | |
| H04L 1/00 | (2006.01) | |
| H04L 12/18 | (2006.01) | |
| H04L 69/14 | (2022.01) | |
| H04L 67/104 | (2022.01) | |

(Continued)

(52) U.S. Cl.
CPC .............. *G06F 13/00* (2013.01); *G06Q 10/10* (2013.01); *H04L 1/00* (2013.01); *H04L 1/004* (2013.01); *H04L 12/18* (2013.01); *H04L 12/185* (2013.01); *H04L 65/00* (2013.01); *H04L 65/65* (2022.05); *H04L 67/06* (2013.01); *H04L 67/104* (2013.01); *H04L 67/52* (2022.05); *H04L 69/14* (2013.01); *Y02D 30/50* (2020.08)

(58) Field of Classification Search
CPC ..... G06Q 10/10; H04L 67/104; H04L 65/608; H04L 12/185; H04L 65/00; H04L 69/14; H04L 1/00; H04L 67/06; H04L 12/18; H04L 67/18; Y02D 50/30
See application file for complete search history.

(56) References Cited

U.S. PATENT DOCUMENTS

| | | |
|---|---|---|
| 5,170,482 A | 12/1992 | Shu et al. |
| 5,983,323 A | 11/1999 | Billard et al. |

(Continued)

*Primary Examiner* — Ajay Ojha
(74) *Attorney, Agent, or Firm* — Edward C. Kwok; VLP Law Group LLP

(57) ABSTRACT

A low-latency, high-bandwidth, and highly scalable method delivers data from a source device to multiple communication devices on a communication network. Under this method, the communication devices (also called player nodes) provide download and upload bandwidths for each other. In this manner, the bandwidth requirement on the data source is significantly reduced. Such a data delivery network is scalable without limits with the number of player nodes. In one embodiment, a computer network includes (a) a source server that provides a data stream for delivery in the computer network, (b) player nodes that exchange data with each other to obtain a complete copy of the data stream, the network nodes being capable of dynamically joining or exiting the computer network, and (c) a control server which maintains a topology graph representing connections between the source server and the player nodes, and the connections among the player nodes themselves. In one embodiment, the control server is associated with a network address (e.g., an IP address) known to both the source server and the player nodes. The data stream may include, for example, a real-time broadcast of a sports event.

36 Claims, 4 Drawing Sheets

Related U.S. Application Data continuation of application No. 15/972,447, filed on May 7, 2018, now Pat. No. 10,678,713, which is a continuation of application No. 11/623,045, filed on Jan. 12, 2007, now Pat. No. 9,990,607.

(60) Provisional application No. 60/759,092, filed on Jan. 13, 2006.

(51) Int. Cl.
*H04L 65/65* (2022.01)
*H04L 67/52* (2022.01)
*H04L 65/00* (2022.01)
*G06Q 10/10* (2023.01)

(56) References Cited

U.S. PATENT DOCUMENTS

| | | |
|---|---|---|
| 6,289,488 B1 | 9/2001 | Dave et al. |
| 6,973,559 B1 | 12/2005 | Deneroff et al. |
| 7,130,807 B1 | 10/2006 | Mikurak |
| 7,167,921 B1 | 1/2007 | Ben-Zvi et al. |
| 7,209,964 B2 | 4/2007 | Dugan et al. |
| 7,225,249 B1 | 5/2007 | Barry et al. |
| 7,366,114 B2 | 4/2008 | Park et al. |
| 7,779,012 B2 | 8/2010 | D'Urso |
| 2004/0022237 A1 | 2/2004 | Elliott et al. |
| 2004/0042473 A1 | 3/2004 | Park et al. |
| 2005/0154790 A1 | 7/2005 | Nagata et al. |

BALANCED NETWORK AND METHOD

CROSS REFERENCE TO RELATED APPLICATIONS

The present application is a continuation patent application of U.S. patent application ("Copending application"), Ser. No. 16/859,833, entitled "Balanced Network and Method," filed on Apr. 27, 2020, which is a continuation patent application of U.S. patent application Ser. No. 15/972,447, entitled "Balanced Network and Method," filed on May 7, 2018, which is a continuation patent application of U.S. patent application, Ser. No. 11/623,045, entitled "Balanced Network and Method," filed on Jan. 12, 2007, which is related to and claims priority of U.S. provisional patent application ("Provisional application"), entitled "Efficient Data Delivery to Multiple Devices on Communication Networks," Ser. No. 60/759,092, filed on Jan. 13, 2006. The Copending application and the Provisional application are hereby incorporated by reference in their entireties.

BACKGROUND OF THE INVENTION

1. Field of the Invention

The present invention relates to computer networks. In particular, the present invention relates to a dynamic computer network providing a data delivery network.

2. Discussion of the Related Art

In a conventional client-server system, the server, which is the data source, provides the entire download bandwidth for all clients. For a large network that services a large number of clients—thus requiring require a high download bandwidth—the server is required to have a huge upload capacity to support the demands from these clients. For this reason, a conventional client-server system for delivering high bandwidth content is not scalable with the number of clients.

SUMMARY

The present invention provides a low-latency, high-bandwidth, and highly scalable method for delivering data from a source device to multiple communication devices on a communication network. Under this method, the communication devices (also called player nodes) provide download and upload bandwidths for each other. In this manner, the bandwidth requirement on the data source is significantly reduced. Such a data delivery network is scalable without limits with the number of player nodes.

According to one embodiment of the present invention, a computer network includes (a) a source server that provides a data stream for delivery in the computer network, (b) player nodes that exchange data with each other to obtain a complete copy of the data stream, the network nodes being capable of dynamically joining or exiting the computer network, and (c) a control server which maintains a topology graph representing connections between the source server and the player nodes, and the connections among the player nodes themselves. In one embodiment, the control server is associated with a network address (e.g., an IP address) known to both the source server and the player nodes. The data stream may include, for example, a real-time broadcast of a sports event.

According to one embodiment of the present invention, a method at a source server for distributing a video data stream includes: (a) setting up a source for the data stream (e.g., a digital video camera or a digitizer for an analog video camera); (b) encoding the data stream by hardware or software (e.g., Microsoft Windows Media Encoder), including meta data describing the control and organization of the data stream; (c) connecting to the delivery network through the control server and providing the meta data to the control server and (d) providing the data stream to the delivery network when multiple player nodes are active in the delivery network. Upon receiving the packets of the data stream, a player node in the data delivery network decodes the data stream to recover the video data for subsequent or concurrent play back.

According to one embodiment of the present invention, a player node is provided software that connects the player node to the control server to join the delivery network. If the source server is connected to the delivery network, the control server provides the player node with meta data of the data stream.

Data packets between the control server and the network nodes (including the source server and the player nodes) include (a) control packets, (b) keep-alive packets and (c) data packet exchanged between the network nodes.

Data delivery performance according to the present invention may be achieved in a network in which each node connects to multiple senders and receivers and to a data source through multiple root paths. Especially in a balanced network, the propagation ratio may be enhanced by the backward traffic, preferably fast backward traffic. In some systems, the majority of the data is delivered by exponential data propagation. In a balanced network, each node is only required to have a self-sustained bandwidth capacity. When a node disconnects from the network, a new node may be replace the disconnected node. Error correction codes may be use to enhance robust data delivery. Control steps reduce the bandwidth burst problems in the output and the input data of each node.

The present invention is better understood upon consideration of the detailed description below in conjunction with the accompanying drawings.

Figure 1:
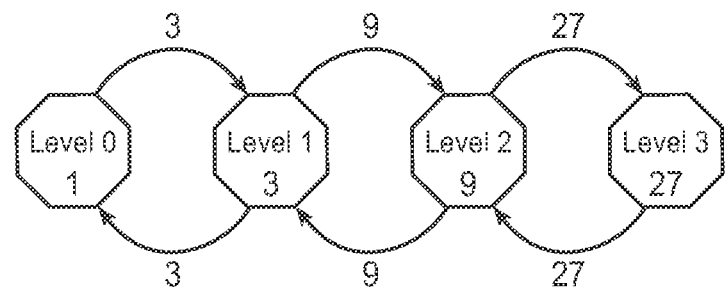
FIG. 1 illustrates fast backward traffic, which is backward traffic sent between nodes at levels l and l+1, rather than at higher levels.

DETAILED DESCRIPTION OF THE
PREFERRED EMBODIMENTS

In the present detailed description, the topology of a data distribution or delivery network of the present invention is first described. Thereafter, a method for transferring data on the data delivery network among the player nodes based on the topology of the data delivery network is described. The data delivery network and the method may be practiced together. The data transfer method may be used independently to improve the performance of other data delivery systems.

In this detailed description, the data delivery system is illustrated by a mathematical model of a graph, consisting of a set of nodes and links. Physically, a node represents a device on the data delivery system (e.g., a server, a computer, a communication device or any data device) and a link represents a physical medium (e.g., a network connection) between two nodes over which data may be sent, received or both. In such a model, each link connects two nodes. The data delivery system may include one or more data source nodes and one or more data-receiving nodes ("player nodes"). The links may represent connections over which data exchange between connected nodes occur. In this detailed description, the player nodes also exchange their received data with other player nodes. A link need not represent a physical connection; it may also represent a logical link. In some instances, the graph may be a directed graph[1] in which the links are directed. The number of links associated with a node is referred to as the degree of the node. In a directed graph, the in-degree of a node refers to the number of input links of the node. Similarly, the out-degree of a node refers to the number of output links of the node. In some graphs, a special node, referred to as the "root" may be designated. Such a graph is referred to as a rooted graph. In data delivery systems of this description, a data source may be designated as a root node to simplify description; generally, however, a root node is not required to be a data source. A computer network not having the data source can still be as efficient as one that has a data source designated a root node.

[1] In this detailed description, the term "directed" is intended to have a broad meaning. A directed link, for example, may refer to asymmetrical data traffic between two nodes (i.e., unequal traffic in two directions). A directed graph, for example, may refer also to the general graphical concept for maintaining a network topology as discussed in this detailed description. In that case, no actual physical distinction needs to made between the nodes at the ends of the directed link.

In a graph, a sequence of links that connect one node to another node is referred to as a path. In a rooted graph, paths that connect the root node to a given node referred to as a root path to the node. When every node in a rooted graph is connected to the root by a root path, the graph is called a root-connected graph. A data delivery network must be a root-connected graph to allow every node in the graph to receive the data to be distributed from the root node. Root paths are independent if they do not share a common link. The length of the shortest path from the root node to a player node may be used to define a distance between the root and the player node ("root distance"). When each link has a length of one, the length of the shortest path between the root and the player node may be referred to as the level of the player node. Other distance measures may also be used for the root distance, e.g., the physical distance between the root node and the player node, the average transmission delay for data packets provided from the root node to the player node, or the average cumulative cost of providing the data packets from the root node to the player node. The root distance is therefore very general.

In a data communication system, the total data received by all devices in the system plus all data loss from the system equals the total data sent by all devices in the system. In a scalable delivery system, the data source's upload bandwidth is preferably kept small and independent of the number of data sink devices in the system. According to one embodiment of the present invention, to provide a scalable system, the player nodes in the system are provided substantially the same average upload and average download bandwidths. For example, in a system that delivers a 300 Kbps video content, on average each node is provided at least 300 Kbps upload and download bandwidths. Such a network is referred in this detailed description is a "balanced network." The download bandwidth for a player node that achieves a minimum acceptable performance is referred to as "minimum bandwidth," or "content bandwidth" of the data delivery system. The data delivery network is stable (or in a stable state) if every player node has at least the content bandwidth. A player node is said to have a "self-sustained bandwidth capacity", if both its upload and download bandwidths are at least the content bandwidth.

In a dynamic network (i.e., a network in which the nodes are allowed to join and leave the network arbitrarily), when all the nodes have a self-sustained bandwidth capacity, the network may be made stable. A fixed network (i.e., the nodes and links do not change over time) with nodes having self-sustained bandwidth capacities may also be made stable. Such fixed and dynamic networks are low cost and low-maintenance. A stable delivery network in which each node is only required to have self-sustained bandwidth capacity is referred to as a "minimum bandwidth network."

In any subset of nodes in a balanced network, the total sending bandwidth and the total receiving bandwidth of the nodes in the subset are the same, as every node in the balanced network is a balanced node.

In this detailed description, "forward traffic" refers to data traffic flowing between a node of a smaller root distance to a node of a greater root distance. "Backward traffic" refers to data traffic flowing from a node of a greater root distance to a node of a smaller root distance.

After a node receives a data packet, it sends out—spontaneously or upon request—multiple packets that are each either the same as the received packet or a packet that can be derived from the received packet and other packets the node already has. This process is referred to as "data multiplying." It is advantageous for a data delivery system to perform data multiplying until all the player nodes receive a copy of the data to be distributed. Data multiplying may be characterized by three factors: (a) $m_d$, which is the number of packets sent out from the player node resulting from one data packet received; (b) $m_p$, which is the portion of the received packets that are multiplied; and (c) $m_t$, which is the time interval between two successive data multiplying steps.

The propagation ratio P, which is the ratio between the numbers of multiplied or multiplexed packets in two successive steps, is given by $P=m_p m_d$. If the propagation ratio P is greater than 1, the number of packets that is multiplied grows exponentially with the number of steps, to allow data delivery to be achieved rapidly. Multiplying degree $m_d$ is limited by the number of connections at each node. Whether or not a packet is multiplied depends also on the available sending capacity of the receiving node. Sending capacity to multiply the next received packet may not be available immediately after the previous packet is multiplied. Such a condition may happen for a backward traffic packet. Hence, packets in forward traffic packets are more likely to be multiplied than packets in backward traffic.

It may appear that data multiplying is maximized when all data traffic is forward traffic. However, backward traffic is essential for a minimum bandwidth network, in which each node is only required to have a self-sustained bandwidth capacity. Backward traffic is beneficial also where a player node has a bandwidth greater than its self-sustained bandwidth capacity. In a fast propagation data delivery system, the number nodes at a certain root distance, or within a certain root distance interval, increases with the root distance. For example, in a delivery system, there may be one node at root distance 0, three nodes at root distance 1, 6 nodes at root distance 2, 12 nodes at root distance 3 and so on. If all output traffic are forward traffic (except for the nodes at the greatest root distance) and if each node only has self-sustained bandwidth, there would not be enough nodes at the smaller root distances with total output bandwidth sufficient to provide the total input bandwidths for the nodes at the greater root distances. Using the previous example, there would not be enough nodes at root distance less than 2 to provide the output bandwidth for the input bandwidth requirement of the nodes at root distance 2. The additional bandwidth may be provided, of course, if each node has more than self-sustained bandwidth.

Backward traffic, however, helps to solve this problem. Since there are more nodes at greater root distances than the nodes at the smaller root distances, some output bandwidth may be allocated from the nodes at the larger root distances to provide the input bandwidth for the nodes at smaller root distances. Backward traffic is also helpful for data delivery systems where the nodes have greater than self-sustained bandwidth. Since (all or some of the) the input bandwidth for nodes at smaller distances is provided by nodes with greater root distances, more output bandwidth from nodes at smaller root distances would be available for forward traffic.

The total backward traffic that is sent from a node with a root distance that is close to the root distance of the receiving node is referred to as "fast backward traffic." For example, as shown in FIG. 1, the backward traffic at level l is sent from level l+1 rather than from higher levels. Hence, this backward traffic is fast backward traffic. In FIG. 1, the number of nodes in each level is shown on each octagon representing the level. The arrows represent data traffic on the links, and the bandwidth associated with each link is provided with the arrows. Each node (except the nodes at the highest level) has an input bandwidth of 4: three of the four links are forward traffic and the remaining link is backward traffic. Each node also has an output bandwidth of 4: three of the four links are forward traffic and the remaining link is backward traffic. Therefore, the propagation ratio shown in FIG. 1 is 3.

Figure 2:
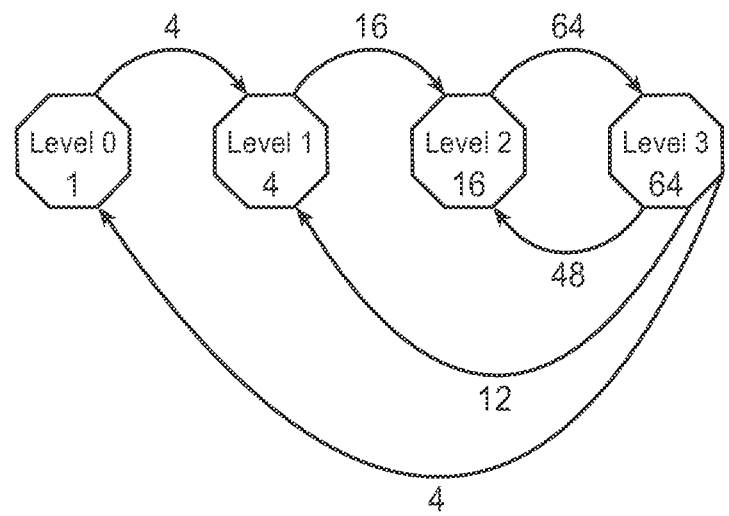
FIG. 2 illustrates backward traffic from higher levels that increase the propagation ratio.

FIG. 2 illustrates that backward traffic from higher levels increase the propagation ratio. As shown, each node in FIGS. 1 and 2 has the same number of output bandwidths and multiplying degrees. The propagation ratio in FIG. 2 is larger. In FIG. 2, each node (except the nodes in the highest level) has input bandwidth of 4—three of the four links are backward traffic and 1 of the 4 is forward traffic) and output bandwidth of 4 (all forward traffic). The propagation ratio is 4.

There are, however, other effects associated with increasing the propagation ratio with backward traffic. First, since data is sent to internal levels by way of the boundary of the network, the delay at internal nodes is much longer. Second, the error correction mechanisms may depend on the backward traffic to recover the data. If the delay in the backward traffic is too large the recovering process will be too long. When a packet is lost and is not recovered from a lower level, the lost packet is not multiplied and thus reduces the forward traffic at the higher levels. The effects are greater with a larger network, because the root distances at the boundary of the network are greater, such that the data packets in the backward traffic have corresponding greater delays. Therefore, in a data delivery network, backward traffic from nodes at levels close to the receiving node is preferred.

To ensure robustness in data transmission, data may be transmitted with an error correcting mechanism. In some error correction algorithms, n units of data are transmitted as n+r units, where the additional r units represent the cost of including redundant information. The error correction algorithm allows the original n units of data to be recovered when k or more units of the transmitted n+r units are received. The ratio n/k is referred to as the "coding efficiency." Some error correction codes (e.g., the Reed-Solomon codes) have coding efficiency of 1. Error correction codes with efficiency of 1 are preferred, although codes with lower coding efficiency are useful in some circumstances. Different kinds of error correction codes may be used for different applications. For example, some error correction codes correct errors exactly. Some error correction codes, however, may only correct errors approximately (e.g., when a portion of the data is lost and not recoverable). In a video application, for example, failure to correct an error may result in degradation to of image or performance. However, the quality of video images partially corrected may still be very acceptable. There are other types of error correction codes for video data that may be used which allows correction to substantially the image quality of the original video when enough of the video data packets are received. The resulting video may simply be different than the original video data.

One embodiment of the present invention uses error correction codes for forward error correction. In forward error correction, a node is sent m (m>n) units of data, such that the node may recover the original n units of data from any n of the m data units are received. Forward error correction incurs only a relatively small delay, as no delay-incurring retransmission is required—the node recovers the original data as soon as the first n units of data are received. If the data units beyond the first n units received suffer a long delay, the overall the data delivery speed is not affected. One disadvantage of forward error correction is low bandwidth efficiency, as the redundant data are sent even without data loss.

To ensure a good forward error correction performance, the probability of transmission loss for each individual data unit is kept as independent as possible. For example, if all data units are transmitted along the same data path, without congestion on the data path, all data units are received, such that the redundant data units are not needed. However, when congestion exists on the path, some data units may be lost and the original data may not be recovered without error recovery.

Having multiple independent root paths to a node in a data delivery system is advantageous, as some data loss is common in communication networks.

According to another embodiment of the present invention, each node is made aware of the data received by its neighbors. In one scheme, such information may be exchanged among the neighboring nodes. Alternatively, the data delivery is specified by the delivery system (e.g., the data source is required to have all the data at all times). In this embodiment, a node requiring data may request the data from a neighboring node. Upon receiving the request, the neighboring node returns the data in reply within a specified time period. If the reply is not received within the specified time period, a new request may be sent. Under this scheme, error correction code can improve efficiency, but may not be necessary. When error correction codes are used, a requester may request either the decoded data unit or a missing encoded data unit. One disadvantage the request-reply scheme is the additional delay incurred by the request-reply protocol. The request-reply scheme, however, has high bandwidth efficiency, as the recovery data is sent only when a data loss has occurred.

To ensure performance under the request-reply method, the probability that the neighbor nodes missing the same data units simultaneously should be minimized, which may be achieved by keeping the probabilities of data loss involving the same data units at two neighboring nodes to be as independent as possible.

Thus, according to one embodiment of the present invention, two basic transmission systems among the nodes may be provided. First, a link-driven data transmission system may be used in a delivery network characterized by directed links. Under this system, a node sends all or a specific part of the data to a neighbor when a directed link is provided between the node and the neighbor. In one embodiment, each node may receive a complete copy of the data. One advantage of a link-driven data transfer system is a predetermined data bandwidth. One disadvantage of the system is that it is not robust with respect to random network changes. For example, if a connection between nodes $n_a$ and $n_b$ is lost, node $n_a$ will not receive the data that would otherwise be received from node $n_b$ until node $n_a$ is assigned a replacement for node $n_b$. Forward error correction may be used in conjunction with this system to improve robustness, at a cost of the bandwidth needed for sending redundant data.

Another basic transmission system in accordance with the present invention is the request-driven data transmission system. Such a system operates best with undirected links. To operate such a system in a network characterized by directed links, the direction of the link may be ignored in the request, or a request is allowed or preferred from a to-node of a directed link to a from-node of the directed link. In this detailed description, under the request-reply transmission system, the direction of a directed link is ignored.

In one implementation, nodes directly connected to a data source (e.g., the root node) request data directly from the data source; the other nodes request data from each other. One advantage of a request-driven data transmission system is that the system is robust with respect to network changes. When a node loses connection with one of its neighbors, the node simply redirects its request for data to another connected neighbor. One disadvantage of a request-driven data transfer system is a lack of predictability on the amount of data a node may receive or may request. Further, a node may receive from its neighbors data requests that exceed its output bandwidth (the "request burst problem"). Similarly, a node may also receive data replies that exceed its input bandwidth (the "reply burst problem"). Either situation leads to data loss. The request and reply burst problems may be reduced by using priorities to differentiate data traffic. For example, each node may prioritize the request and the reply of data packets based on the priorities of the packets. Under a priority scheme, transmission of high priority data is likely to be successful and predictable. Provided that the low priority data relates only a small portion of all data, the unpredictability of such low priority data may be insignificant.

A node preferably receives data packets from multiple links. If one link fails, the node may still receive data from other links. To improve loss recovery, the system is designed such that the probabilities of losing a data packet at different links (e.g. due to a broken link or a high loss rate a link) are substantially independent. This way, the probability of simultaneously losing data packets in multiple links is reduced. One way to enhance packet loss independency on different links is to arrange the delivery network such that each node (or a majority of the nodes) has multiple independent root paths.

The root paths may be arranged such that each node receives different portions of the data from different root paths. Multiple independent root paths also enable efficient loss recovery. If some data packets to a node are lost in one root path, the lost data may be recovered from other root paths. In independent root paths, losing data simultaneously from multiple root paths is relatively unlikely, so that there is a higher probability of successful data recovery. If the independent root paths are close in root distances, data recovery is rapid through fast backward traffic. The benefits of independent paths may be achieved to a lesser degree in some non-independent root paths, such as those sharing common nodes at very low levels.

Alternatively, the request and reply burst problems may also be addressed by a reservation system. A node may send reservation requests to reserve a certain input or output bandwidth at its neighbor nodes. Using a distributed algorithm carried out at a node, or a centralized algorithm carried out at the central controller, each node determines if the reservation request should be granted. Of course, the granting policy may depend on the priorities of the requests.

Link-driven and request-driven data transmission systems may be combined. In one embodiment, the link-driven data transmission mechanism is assigned a higher priority than the request-driven data transmission mechanism. Under this arrangement, as the major traffic is link-driven, the traffic bandwidth remains predictable. At the same time, this system enjoys the efficiency of data recovery by the request-driven mechanism.

According to one embodiment of the present invention, the data packets of a data stream are assigned to G groups[2]. At the same time, the nodes are also assigned to the same number of groups. (The data packets or the nodes may preferably be assigned evenly to the groups). In one implementation, the nodes in each group are responsible for sending the majority of a corresponding group of data packets. It is convenient to associate each node group and its corresponding data packet group the same label (e.g., a group number). In this detailed description, to simplify the discussion, such a group number association is assumed. Each node receives data packets from nodes of at least $G_m$ groups, the value $G_m$ being the minimum number of groups of data sufficient to recover the original data.

[2]In this detailed description, the term "group" has a broad meaning. Two nodes having any difference may be seen as belonging to different groups. Alternatively, nodes may be arbitrarily assigned to groups in the general graphical concept described herein for maintaining a network topology. In that case, no physical difference between nodes in different group is necessary.

In a minimum bandwidth network, each node receives one copy of the data from $G_m$ different data groups and sends $G_m$ copies of the data associated its the node group number. Accordingly, the input bandwidth is the same as the output bandwidth. Such grouping allows exponential data propagation on a minimum bandwidth network. Since each node on the average sends data in one group, a node with self-sustained bandwidth capacity can send multiple copies of data packets of its node group number. Grouping may be applied to both in link-driven data transmission and request-driven data transmission mechanisms. In a request-driven data transmission system, grouping reduces the request and reply burst problems. Because the requests to each node are mainly for data packets associated with its node group number, the resulting requests and replies are substantially evenly distributed. In addition, a priority scheme may be used with grouping in a request-driven data transmission system. For example, the highest priority may be assigned to requests and replies that have their requestors, repliers and data packets all share the same group number. A lesser priority may be assigned to those requests in which the requestors and the data packets are in the same group, but not the same group as the replier, or those in which the repliers and the data packet are in the same group, but not the same group as the requester. The least priority may be assigned to all other requests and replies.

From time to time, in a dynamic data delivery system, new nodes are added, existing nodes are removed, and an existing node may be moved (i.e., the node's position in the associated graph is changed). When a new node is added to the data delivery system, new links are added to connect the new node with the existing nodes. To keep the network balanced, a new node has to send data out along the added links. When an existing node is removed from the data delivery system, the links associated with the removed node are broken. Hence, the present invention provides a method for handling broken links and maintaining the integrity of the remaining nodes of the network. Similar methods are provided for changing a node's position in the data delivery system.

Figure 3:
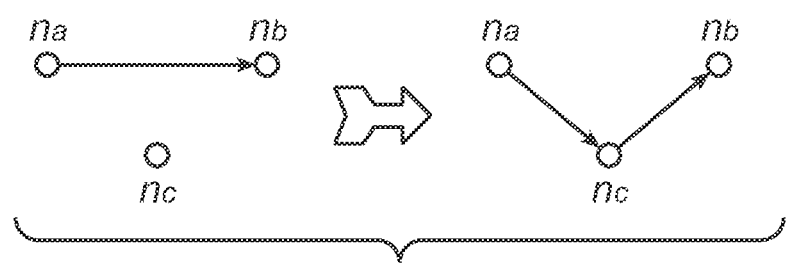
FIG. 3 illustrates a link insertion technique that reduces the disturbance associated with adding or removing nodes from a data delivery system.

It is important to avoid, during the process of adding or removing player nodes from the data delivery system unduly disturbing the reliable operations of the remainder of the network. For example, consider a player node which is using all of its sending capacity to provide essential data to its neighbors. If a new node simply connects into this player node to receive data, existing player nodes may suffer a performance degradation resulting from the reduced sending or receiving bandwidth. FIG. 3 illustrates a link insertion technique that reduces the disturbance associated with adding and removing nodes player from a data delivery system.

FIG. 3 shows insertion of a directed link. As shown in FIG. 3, prior to the insertion, a directed link connects node $n_a$ to another node $n_b$. A third node, node $n_c$, seeks admission to the data delivery network. To insert node $n_c$ into the associated graph of the data delivery network, the link between node $n_a$ to another node $n_b$ is removed and two new links—from $n_a$ to $n_c$ and from $n_c$ to $n_b$—are added. Node $n_a$ and node $n_b$ are referred to as "father" and "mother" nodes of node $n_c$, respectively. The reverse procedure removes node $n_c$ from the graph: an in-link and an out-link to node $n_c$ are removed and, at the same time, the from-node of the in-link and the to-node of the out-link are connected. Under the method shown in FIG. 3, the numbers of in-links and out-links of the originally connected nodes $n_a$ and $n_b$ are not changed, link insertion allows the size of the data delivery network to change dynamically with minimal effects on its performance. Further, an existing node can supply new nodes without additional sending capacity. Thus, the process allows exponential data propagation (i.e., scalability of the data delivery network). The link insertion and removal processes for undirected links are similarly performed in an undirected graph.

Constraints may be added to limit the nodes and the links that participate in link insertion for better performance and other desirable characteristics. Such constraints may be based, for example, on the topology of the data delivery network.

One constraint that may be applied to the link insertion of FIG. 3, for example, requires that the root distance of node $n_c$ to be greater than the root distances of both of the two originally connected nodes. Such a constraint may be used to enforce a balanced network. To enable a faster backward traffic, for example, another constraint on the link insertion may require difference of root distances of node $n_c$ and $n_b$ to be smaller than a predetermined value. To facilitate node grouping, an in-link to a new node joining the group may be required to originate from another node in the group.

In a data delivery system, when the bandwidth capacity requirements of two nodes are the same, the two nodes may swap their positions in the network without affecting the network's performance. This technique facilitates node removal from the graph associated with the data delivery system. For example, when removing a node from a given position of the graph may cause difficulty in reconnecting the broken links due to other constraints, such difficulty may be avoided if the node is swapped with another, so that the node to be removed is moved into a position where its subsequent removal would not cause a reconnection difficulty.

Figure 4:
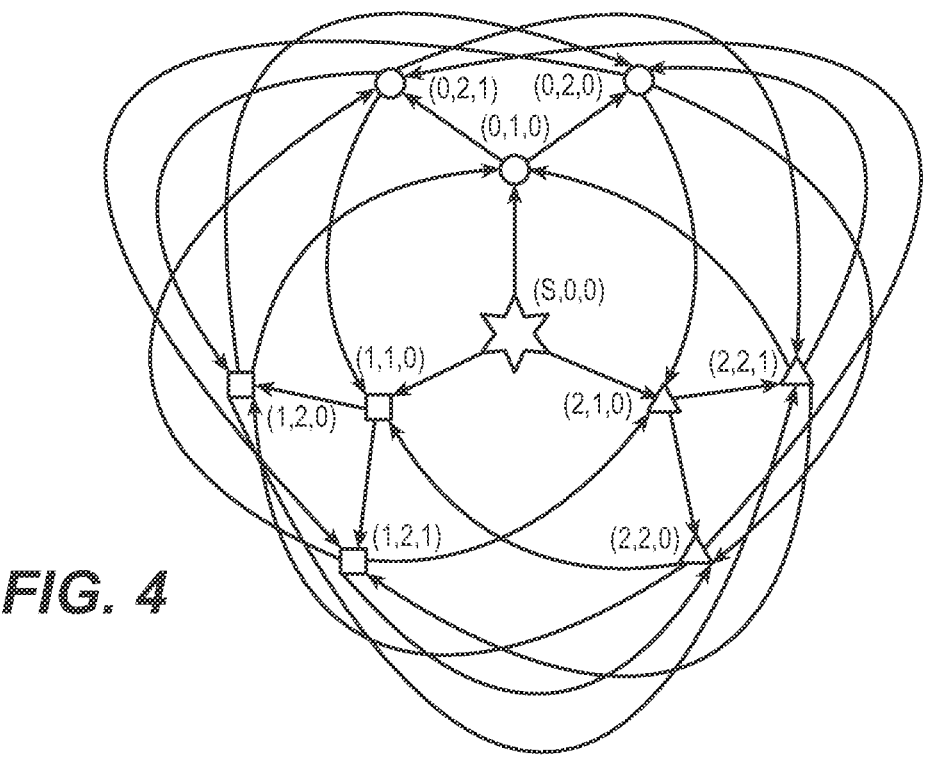
FIG. 4 illustrates directed graphs ("New Graphs") suitable for building a data delivery system, in accordance with one embodiment of the present invention.

FIG. 4 illustrates a new type of directed rooted graphs ("New Graph") suitable for building a data delivery system, in accordance with one embodiment of the present invention. As shown in FIG. 4, the New Graph includes a root node which is represented in FIG. 4 by a star symbol. Other nodes are represented in the graph by symbols associated with the nodes' respective assigned groups. Each node is labeled by a triplet (g, l, q), where g is the group number, l is the level or root distance, and q is a local number which distinguishes the node from other nodes within the same group and level. This triplet serves as a unique identification for the node in the network. In this instance, the root node is assigned a special group number S. Each link is also assigned a group number corresponding to the group number of the data packets placed on the link by a link-driven data transmission system. A link is denoted as $[g_i, (g_f, l_f, q_f), (g_t, l_t, q_t)]$, where gi is the group number of the link, $(g_f, l_f, q_f)$ and $(g_t, l_t, q_t)$ are the node labels of the from-node and the to-node, respectively. In FIG. 4, the links have the group numbers of their respective from-nodes (except, for links from the root node, which take the group numbers of their respective to-nodes).

The absolute value of the difference between the levels of the two nodes is referred to as the "level gap." The level gap of between the nodes at the ends of a link may be required to be less than a predetermined maximum level gap $\Delta_{max}$ (in FIG. 4, $\Delta_{max}$ is 1). When the level gap of a link is the maximum level gap $\Delta_{max}$ (as in FIG. 4), the link is referred to as a "tight link." With a maximum level gap of 1, fast backward traffic is achieved. Other choices of the maximum level gap increase delay.

An "in-link rule" specifies the in-links that a node of a given group may connect. From a data traffic point of view, the in-link rule indicates the groups of data packets that a node in a given group should receive under a link-driven data transmission system. In some systems, the in-link rule may be provided in the form of matrix $M_g$ ("in-link group matrix"). In in-link group matrix $M_g$, a '1' at element (i, j) indicates that each group j node has an in-link connected to a group i node. For example, in FIG. 4, each node, other than the root node, has G in-links each of a different group:

$$\begin{bmatrix} 1 & 1 & 1 \\ 1 & 1 & 1 \\ 1 & 1 & 1 \end{bmatrix}.$$

In other systems, each non-root node may have $D_{in} < G$ links. In a link-driven data transmission system, the root node sends out G groups of data, with each player or non-root node receiving $D_{in}$ groups of the data. The value $D_{in}$ is greater than the minimum number of data groups required to allow reconstruction of data sent out from the root node. (Under a forward error correcting scheme, for example, G may be set greater than $D_{in}$ to provide data redundancy in the system). For example, such an in-link group matrix may be $$\begin{bmatrix} 1 & 1 & 0 \\ 0 & 1 & 1 \\ 1 & 0 & 1 \end{bmatrix},$$

which indicates that each group 0 node would have in-links in groups 0 and 1. Similarly, each group 1 node would have in-links in groups 1 and 2, and each group 2 node would have in-links in groups 2 and 0, respectively.

In some systems, the in-link rule may be specified without reference to specific rules relating node groups to link groups. For example, it may be sufficient to specify that each node has $D_{in}$ in-links selected from G groups.

In many cases, an out-link rule which merely specifies the maximum number of out-links of a non-root node to be $D_{outMax}$ is sufficient. A self-sustained bandwidth capacity can be achieved by specifying $D_{outMax}$ to be the same as $D_{in}$. The data delivery network of FIG. 4, for example, has $D_{outMax}$ and $D_{in}$ set to 3. Alternatively, $D_{outMax}$ may be set to be greater than $D_{in}$ to create a data delivery network with additional capacity. The in-link rule is preferably consistent with the out-link rule. For example, the maximum number of out-links of a node specified by the out-link rule is preferably greater or equal to the number of in-links to each node specified by the in-link rule.

Figure 5:
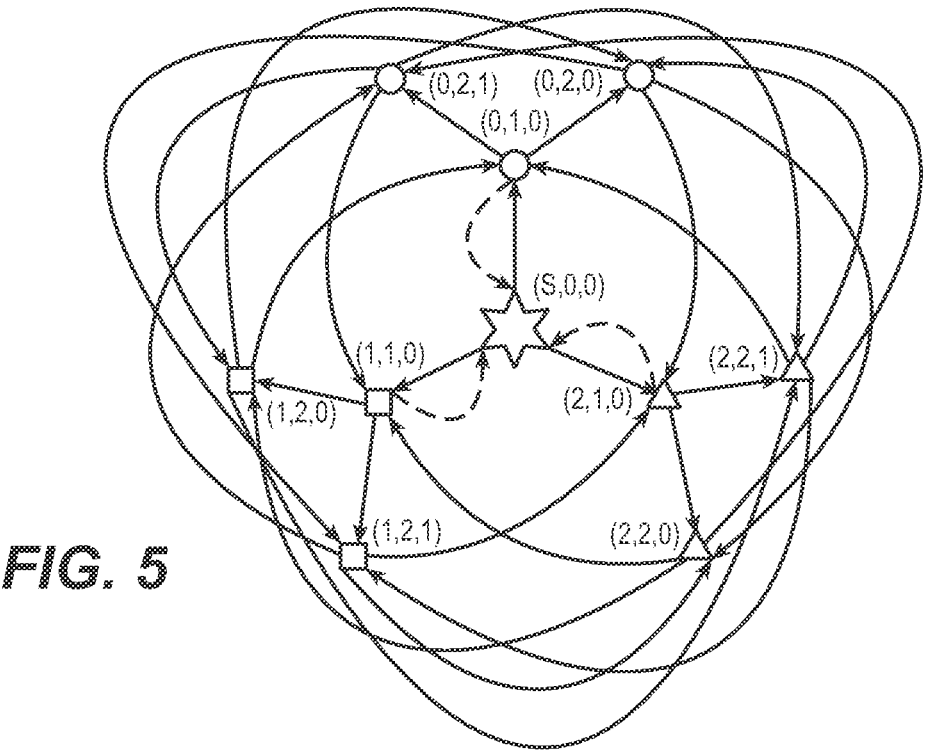
FIG. 5 shows that, when a directed link (represented by a dashed line) is created from each level 1 node to the root node, every node in the graph of FIG. 4 has the same number of in-links as in the number of out-links.

In FIG. 4, except for the root node and non-root nodes at level 1 (which has one more in-links than out-links), each node has the same number of in-links as out-links. The root node has no in-links. If a directed link is created from each level 1 node to the root, as shown by dashed lines in FIG. 5, every node in the graph of FIG. 4 will have the same number of in-links as out-links. As the root node is the source of the data stream, the dashed links are not connected, providing additional capacity in the level 1 nodes. In general, in a system where all the nodes have self-sustained bandwidth capacities, extra output bandwidth exists because the root node does not receive content data. Many different design strategies exist to select the nodes to have the extra bandwidth. One method reserves the extra bandwidth for the level 1 nodes. The additional capacity in the level 1 nodes is desirable.

It is also advantageous to have the groups roughly of the same size. Where the same number of nodes are provided to each group, all the nodes satisfy the in-link rule and out-link rule. Otherwise, some nodes may not satisfy the in-link rule by having less in-links than specified by the in-link rule. Such nodes are referred to as "defective nodes." The missing in-links are referred to as "missing links."

To facilitate the discussion below, a link is referred to as a "family link" when (a) for a link whose from-node is not the root node, the group numbers of the to-node, the from-node, and the link are the same; or (b) for a link whose from-node is the root node, the group number of the link is the same as the to-node of the link. The from-node of a family link is called the father of the to-node and the to-node of a family link is called the child of the from-node. The number of family out-links may be limited to maximum value $F_{max}$ (i.e., the maximum number of children a father node may have). In the graph of FIG. 4, $F_{max}=2$.

In summary, a New Graph has the following characteristics:

(a) each non-root node has multiple independent root paths, with each root path going through a node of a different group. For example, in FIG. 4, each node has 3 independent paths of approximately the same length between l to $l+\Delta_{max}+1$, where l is the level of the node. Thus, in FIG. 4, for example, the lengths of the root paths of each non-root node range between l to l+2. The maximum average length of a root path grows as a log function O(log(N)) of the total number N of nodes; the number of transmissions for a data packet before it is received at a number also grows as O(log(N)).

(b) an independent root path to a node may pass through a node with a higher level (i.e., includes backward traffic).

(c) the capacity of the graph grows exponentially with the maximum level of the graph. Table 1 shows the maximum number of nodes at each level:

| Level | 1 | 2 | 3 | 4 | 5 | 6 |
|---|---|---|---|---|---|---|
| Number of Nodes | 3 | 6 | 12 | 24 | 48 | 96 |

One algorithm for maintaining a New Graph is next illustrated. When a new node is added into the graph or when an existing node is removed, the number of link operations (including link connections and disconnections) required is bounded by a constant value and independent of the number of nodes in the graph. This algorithm is characterized by five design parameters: (a) the number G of groups; (b) the maximum level gap $\Delta_{max}$ for the links; (c) the maximum number $F_{max}$ of family out-links of a non-root node; (d) max out-degree $D_{outMax}$ of a non-root node; and (e) an in-link rule.

A link is referred to as a "prime link" when: (a) for a link having a non-root from-node, the group numbers of the link and its from-node are the same; or (b) for a link from a root node, the group numbers of the node and the link are the same. Hence, a family link is a prime link.

Under this algorithm, node $n_n$ ($g_n$, $l_n$, $q_n$) may be added according to the steps of Algorithm 1:

(a) assigning node $n_n$ to group $g_n$;
(b) connecting a family link;
(c) connecting non-tight prime links; and
(d) connecting helper links.

Group $g_n$ is preferably the group, or one of the groups, with the smallest population, so that the nodes are distributed in the groups as evenly as possible. (When the number of non-root nodes is a multiple of the number of groups, each group has the same number of nodes.)

Step (b) of Algorithm 1 (i.e., "connecting a family link") may be carried out by the steps of Algorithm 2:
- (a) if node group g is empty, add a family link between the root node and node $n_n$, such that the root node becomes the father of the node $n_n$; and
- (b) otherwise (i.e., if node group g is not empty),
  - (I) try:
    - (1) find node $n_f$ in group g that satisfies (i) the number of out-links is less than $D_{outMax}$; (ii) the total number of family links of node $n_f$ that are out-links is less than $F_{max}$; (iii) among nodes satisfying (i) and (ii), node $n_f$ has all the required in-links according to the in-link rule; and (iv) among nodes satisfying (i)-(iii), node $n_f$ has the smallest level; and
    - (2) add a family link from node $n_f$ to node $n_n$, such that node $n_f$ becomes the father node of the node $n_n$.
  - (II) if (I) is not successful, try:
    - (1) select node $n_f$ (g, $l_f$, $q_f$) in node group g that satisfies (i) node $n_f$ has a non-tight prime link $L_{fm}$ [g, (g, $l_f$, $q_f$), ($g_m$, $l_m$, $g_m$)] to node $n_m$ in a different group $g_m$, such that $|l_f-l_m|<\Delta_{max}$ and $g \ne g$; (ii) the total number of outgoing family links of node $n_f$ is less than $F_{max}$; and (iii) among all the nodes that satisfy (i) and (ii), node $n_f$ has the smallest level in the group.
    - (2) remove the non-tight prime link $L_{fm}$ [g, (g, $l_f$, $q_f$), ($g_m$, $l_m$, $q_m$)] from the graph; and
    - (3) add prime links $L_{fn}$ [g, (g, $l_f$, $q_f$), (g, $l_n$, $q_n$)] and L [g, ($g_n$, $l_n$, $q_n$), ($g_m$, $l_m$, $q_m$)], such that $n_f$ (g, $l_f$, $q_f$) becomes the father node of node $n_n$ and node $n_m$ becomes the mother node of node $n_f$ ($g_m$, $l_m$, $q_m$)

Figure 6:
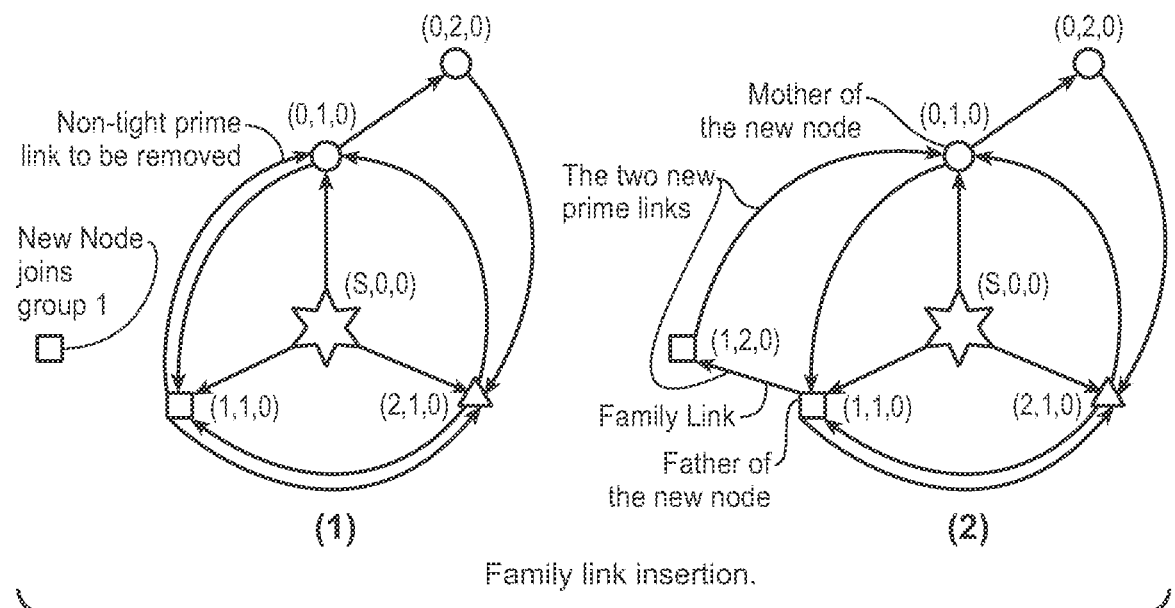
FIG. 6 illustrates a family link insertion in a New Graph, in accordance with one embodiment of the present invention.

Steps (c)(2)-(3) of Algorithm 2 is referred to in this detailed description as "family link insertion." An example of a family link insertion is shown in FIG. 6. As shown in FIG. 6, after node $n_n$ is assigned to node group 1, the non-tight prime link from node (1, 1, 0) to node (0, 1, 0) is replaced by new links between (1, 1, 0) to (1, 2, 0) and between (1, 2, 0) and (0, 1, 0).

Family link insertion may be implemented with some constraints, such as a level gap constraint. For example, after inserting the family link between father node $n_f$ to new node $n_n$, the level of new node $n_n$ is $l_n=l_f+1$. Also, because the removed link $L_{fm}$ is not a tight link (i.e., $|l_f-l_m|<\Delta_{max}$). Hence, new links $L_{fn}$ and $L_{nm}$ satisfy the level gap constraints $$|l_f-l_n| \le \Delta_{max},$$

$$|l_n-l_m| \le \Delta_{max}.$$

For the father and mother nodes of $n_n$, their group numbers of their links are not changed by the family link insertion process, such that these nodes still satisfy their in-link and out-link rules.

Additional constraints may also be implemented. For example, some nodes may not have children nodes, or may have a number of children nodes less than $F_{max}$. Alternatively, the number of children nodes in a given group at a given level may be limited. Preferably, the number of nodes in each group is kept balanced (or close to balanced).

Step (c) of Algorithm 1 (i.e., "connecting non-tight prime links") may be carried out by the procedure of Algorithm 3: for every node $n_a$ that does not have all the in-links specified in the in-link rule, do:

for every group $g_b$ that a link in group $g_b$ can be added to node $n_a$ according to the in-link rule, do:
- (a) find node $n_b$ in group $g_b$ such that the out-degree of node $n_b \le D_{outMax}$ and $|l_a-l_b|<\Delta_{max}$, where $l_a$ and $l_b$ are the levels of nodes $n_a$ and $n_b$, respectively; and
- (b) connect a prime link from father node $n_b$ to mother node $n_a$.

Figure 7:
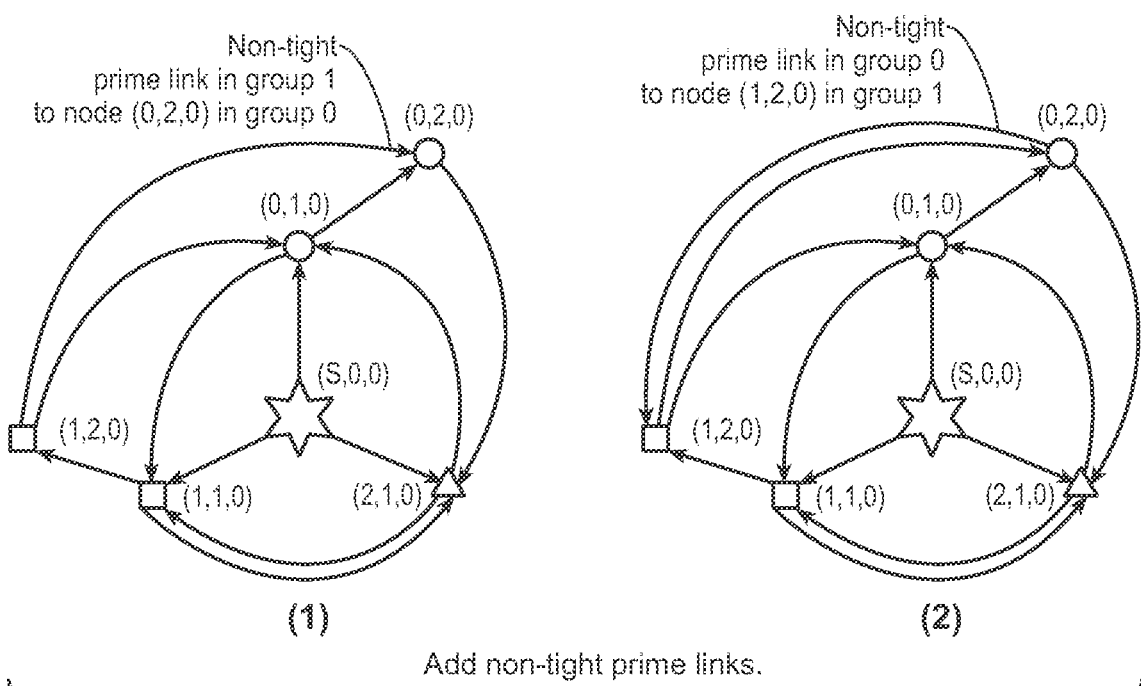
FIG. 7 illustrates connecting prime links between nodes.

FIG. 7 illustrates connecting prime links from node $n_b$ to node $n_a$. As shown in FIG. 7, prime links are inserted from (1, 2, 0) to (0, 2, 0) and from (0, 2, 0) and (1, 2, 0).

Algorithm 4 provides a procedure for carrying out removing node n:
- (a) if node n is in node group g that has the largest population and node n has the largest level in group g, remove node n using the steps of Algorithm 5 below; and
- (b) otherwise (i.e., node n is not in node group g that has the largest population, or node n does not have the largest level in group g),
  - (i) select node $n_a$ such that: (1) node $n_a$ is in node group g with the largest population and (2) node $n_a$ has the largest level in the group;
  - (ii) swap node n and node $n_a$ (i.e., exchanging the in-links of nodes $n_a$ and $n_b$ and exchanging the out-links of nodes $n_a$ and $n_b$); and
  - (iii) remove node n using the steps of Algorithm 5 below.

The removing step at steps (a) and (b)(iii) of Algorithm 4 may each be carried out by performing the steps of Algorithm 5:
- (a) remove all the links connected to node n to be removed;
- (b) if node n has a mother node, add a prime link from the father node of node n to the mother node of node n; and
- (c) connect the non-tight prime links according to the steps of Algorithm 3.

In performing adding and removing nodes according to the Algorithms 1-5 above, the nodes that do not have all the required input links or the nodes whose number of out-links is less than $D_{outMax}$ are all in the levels L greater than $L-\Delta_{max}$ (i.e., the links associated with these nodes are not tight links). If each node group has the same number of nodes, each node will have all the required in-links. Otherwise, some defective nodes exist in the groups that have more nodes than other groups. Since any node group has at most one more node than any other node group, the total number of possible missing in-links for all the nodes in any node group is less than the number of required in-links, $D_{in}$, for one node. The total number of missing links in the whole graph is therefore less than $GD_{in}$. As the non-tight link connection steps of Algorithm 3 are the only steps dealing with the missing links, the total link operations for dealing with such missing links are therefore less than $GD_{in}$. The steps of adding family links and for swapping two nodes in Algorithms 2 and 4, respectively, take a constant number of link operations. Hence, the maximum number of link operations for adding or removing a node is a constant, i.e. independent of the number of nodes in the graph.

Algorithms 1-5 above for adding and removing nodes may generate defective nodes. Additional helper links may be added to the graph such that each node has the required in-links. Algorithm 6 provides a procedure for adding helper links:

for each node $n_a$ that does not have all the in-links required by the in-link rule, do:

(a) select a node $n_b$ that has all the in-links required by the in-link rule, but has an out-degree less than $D_{outMax}$; and
(b) connect a helper link from node $n_b$ to node $n_a$;
until node $n_a$ has all the in-links required by the in-link rule.

Figure 8:
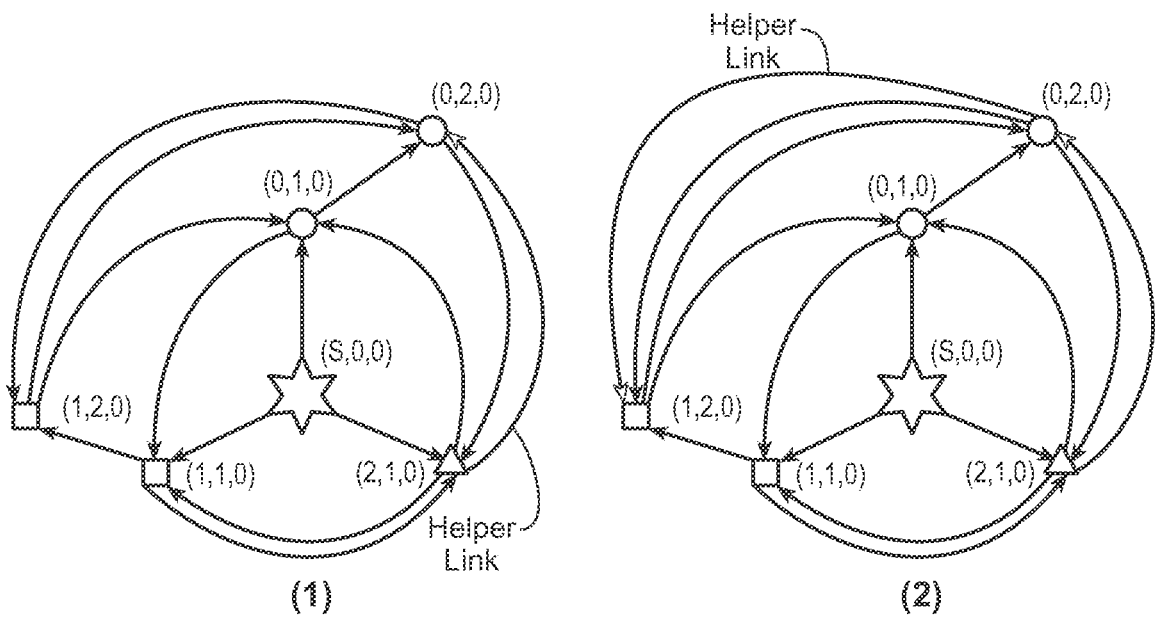
FIG. 8 illustrates connecting helper links as provided above with respect to Algorithm 6.

FIG. 8 illustrates connecting helper links as provided above with respect to Algorithm 6. As shown in FIG. 8(1), a helper link of group 2 is added from node (2, 1, 0) from node (0, 2, 0); as a result, node (0, 2, 0) has the required number of in-links specified for the in-link rule. Similarly, in FIG. 8(2), node (0, 2, 0) provides an in-link for node (1, 2, 0).

Similar to the helper links for defective nodes, another kind of helper links may be added to help the nodes without sufficient output bandwidth capacity. For nodes having more than sufficient output bandwidth capacity, helper links can be added from these nodes to the receivers of the nodes without sufficient output bandwidth capacity. Other kinds of links may also be added to the graph. For example, links that are used only for request-driven data transmission may be added to the graph to provide a data recovery capability. Since traffic under a request-driven data transmission scheme is given a lower priority than traffic under a link-driven data transmission scheme, such links would not have much traffic until a failure occurs in the link-driven data transmission scheme.

So far, the graph operations do not take into consideration physical properties of the nodes. In addition to minimizing the number of data packets, other physical properties, such as delay, loss rate, transmission cost, and reliability of individual links may also be taken into account. For example, where a choice exists for connecting to one of several nodes, the selection may be made based on these physical factors. In one instance, the physical location of a node may be discovered using its IP address. A selection based on physical proximity may then be made to improve performance.

Figure 9:
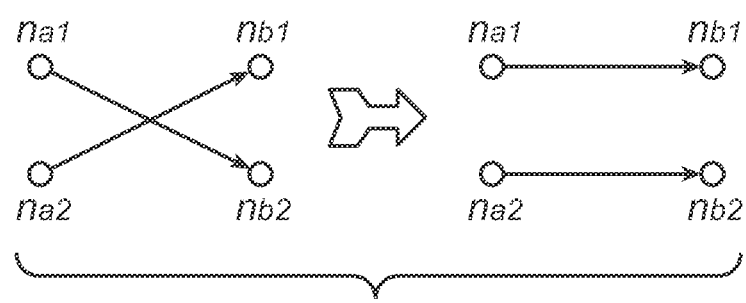
FIG. 9 shows a "link exchange" technique which may be used to improve performance in a data delivery system of the present invention.

FIG. 9 shows a "link exchange" technique which may be used to improve performance. As shown in the left-hand side of FIG. 9, nodes $n_{a1}$ and $n_{a2}$ are nodes of the same group and at the same level. If the physical locations of nodes $n_{b1}$ and $n_{b2}$ are such that an exchange of links in the manner shown in the right-hand side of FIG. 9 would improve performance (e.g., the delay at nodes $n_{b1}$ and $n_{b2}$ may be shortened), the link exchange may be performed.

The graph associated with the data delivery system may be kept in a single computer or in a distributed manner. For example, a master computer may be provided to keep the portion of the graph that includes the lowest levels, with portions of the higher levels of the graph being divided among a number of slave computers. Each slave computer may maintain its respective portion of the graph, and communicate with the master computer and other slave computers for operations on nodes at the interfaces among their respective portions of the graph. For example, a set of interface nodes may have G nodes at the same level, G being the number of different groups. A balancing computer may be used to balance the number of nodes in each slave computer.

As discussed above, a single centralized controller can be used to construct and maintain the topology of the data delivery system. The central controller's may have an address that is publicly known by all nodes, including the root and the non-root nodes.

The controller keeps records of the nodes. These records may be organized as a conventional database (e.g., MySql), or memory space allocated to store the structured records. For each node, a record may provide:
(a) an address of the node (e.g., an IP address and port number) suitable for communication use among nodes;
(b) a unique node ID (in some instances, the address of a node may be used as the unique node ID);
(c) the label of the node in the graph (e.g., the triplet (g, l, q));
(d) the status of communication between the nodes and the controller and between the nodes and it neighbors (e.g., a record of the last time that the controller receives data packets from the node);
(e) the links associated with the node; and
(f) the status of communication of each link (e.g., the idle time of the link).

Generally, link status information is sent from the nodes to the controller regularly. However, to save communication bandwidth, the link status information may be sent to the controller only under an exception condition.

In this detailed description, the root node has the original data. When no redundant data is used the root node is responsible for sending data to the network at a predetermined content bandwidth. If redundant data is used, the sending bandwidth of root node should be increased proportionally. The data may be a file, a video stream, or any digital data. The data may be obtained from a file system, a video encoding device, or any other digital sources. A mechanism should be provided to inform the non-root nodes of the content of the data. For example, the root node may publish the content information on a web page accessible by the non-root nodes.

The nodes and the controller exchange control packets. Each control packet has data tag specific to the packet type. A reliable data transmission mechanism may be used to deliver the control packets. For example, control packets may be acknowledged. If a control packet is not successful sent after a given level of effort (e.g. a number of retransmissions by the sender), the sender may consider the connection between the two communicating parties broken. One example of a suitable communication protocol includes TCP. Other mechanisms are also possible. For example, one may also use UDP, if retransmission and time-out mechanisms are implemented.

When a controller considers its connection to a node to be broken, the controller removes the node from the data delivery network. Similarly, when the node detects that it is disconnected from the controller, it disconnects itself from the data delivery network.

To improve the robustness of the system, keep-alive packets may be sent periodically between the controller and nodes. If the controller has not received a keep-alive packet from a node for a predefined time period, the controller may assume the connection to the node broken, and thereafter removes the node from the data delivery network. Keep-alive packets may also be used between neighbor nodes. Under this scheme, each node can determine if its neighbors are still in the network.

A root node joins the data delivery system by sending to the controller, for example, a root-register packet, which includes (a) authentication information, such as a user name and an associated password; (b) meta data of the data delivery system, including (i) the number of groups in the graph associated with the data delivery system; (ii) the data buffer required of the non-root nodes; (iii) the average time for measuring loss rate and bandwidth; and (iv) a set of threshold for evaluating a status of the links (e.g., idle time of a link before the link is deemed broken). All of these fields are optional, depending on the desired features of the data delivery system (e.g., authentication is used with access control is desired).

Once the root node is authenticated, the controller sends a root-register-success packet. Otherwise, a root-register-fail packet is sent. The root-register-success packet includes an identification (ID) assigned to the root. Thereafter, non-root nodes may join the data delivery system.

A non-root or player node joins the data delivery system by sending a register packet to the controller. The register packet may contain the authorization information, such as a user name and an associated password. When the controller authenticates the node, a register-success packet is sent to the player node. Otherwise, the controller sends a register-fail packet to the player node.

The register-success packet may include (a) the ID of the node (when enhanced security desired), and (b) meta data of the data delivery system included in the root-register packet. When the controller realizes that the register-success packet is received by the joining node, the controller adds the node to the data delivery network by: (a) assigning a unique ID to the node; (b) setting up a record for the new node; (c) adding the node to the graph using Algorithms 1-3 discussed above, updating the records of all the involved nodes, and (d) sending link-packets to all the nodes whose links are changed during the process. The link-packets may each include (a) the label of the node in the graph (e.g., to determined priority of the data exchange; alternatively, a group number or level may be used), (b) a set of links that the node connects to; and (c) for each link, (i) the ID of the connected node (when enhanced security is desired); (ii) the address of the connected node; (iii) the group and the level of the connected node (e.g., to determine priority in data exchange); and (iv) the direction of the link.

When a node leaves the data delivery network, a log-off packet is sent to the controller. The controller then (a) removes the node from the graph using Algorithms 4-5 discussed above, updating the records of all the involved nodes; (b) sends link-packets to all the nodes whose links are changed during the process; (c) sending a log-off-success packet to the node; and (d) removes the record of the node from the node record database.

From time to time, a node may disconnect unexpectedly (e.g., hardware or software failures) from the network without prior notice to the controller or the other nodes. A node is assumed disconnected if (a) the control packets from the controller fail to reach the node; (b) the controller does not receive a keep-alive packet from the node for a time longer than a predetermined period; (c) there are more than a predetermined number of nodes that report in link-status packets that the node fails to respond to the reporting nodes. Once a node is determined to be disconnected, the controller (a) removes the node from the graph using Algorithms 4-5 discussed above, updating the records of all the involved nodes; (b) sends link-packets to all the nodes whose links are changed during the process; and (c) removes the record of the node from the node record database.

Each node measures the link status (e.g., loss rate, delay, and bandwidth) of the links associated with it. A node having an insufficient bandwidth may be detected by itself or by the controller. For example, a node may discover that its outgoing bandwidth to be less than self-sustaining, so that the average loss rate for the out-going packets is higher than some predetermined threshold. The node may then inform the controller of the bandwidth insufficiency in a link-status packet.

A node reports exceptional link conditions (e.g. high loss rate and high delay) in link-status packets to the controller. When the controller detects a node to have more than a threshold number of exceptional link conditions, the controller may assume that the node does not have enough communication bandwidth. At that time, the controller (a) removes the node from the network, as discussed above; or (b) reassigns selected ones of the node's recipients to other nodes having additional output capacity.

The data stream may be divided into data segments each tagged by a segment number. Each segment may be further divided into data packets, each tagged by a group number. Each data packet may then be identified by the tuplet (s, g), representing the segment number and the group number. Error correction code may be use in each data segment to generate redundant data packets. These redundant data packets are also assigned group numbers. For example, for a data segment with n original data packets and m redundant data packets, the original data packets may be assigned group numbers 0, 1, . . . , and n−1, the redundant packets may be assigned group numbers n, n+1, . . . , m+n−1. As discussed above, merely for convenience, the data packets and nodes in the graph may each be divided into the same number of groups.

In a real-time application (e.g., real-time video), a data packet is required to be delivered within a given time limit T. The data received by the nodes later than this time limit is considered lost. Hence, an active window for the data packets may be set up beyond which data packets may be considered lost. Ideally, the active window should be set up in a common time domain. However, such a time domain requires synchronizing the clocks in all nodes. Alternately, the active window may also be implemented by using a segment number. For convenience, the segment numbers may be assigned consecutively in a non-decreasing manner A segment number window length $W_s$ may be determined by the average number of segments generated by the root during time limit T. If the largest segment number of the data packets received by a node is $S_{max}$, then the node should request or send data packets with segment numbers that are within the window between $S_{max}-W_s$ to $S_{max}$.

Alternatively, an active window may be used for non-real time applications as well. Two advantages are achieved under this approach. First, as all nodes transmit data within a small segment window, it is more likely for a node to obtain a missing data packet from its neighbors. Second, as each node needs only keep track of what its neighbors have within the window, the bandwidth required for communicating with each other regarding the data each holds is reduced.

Although the link-driven data transmission mechanism and the request-driven data transmission mechanism may each be used individually and exclusively, they can also be used together.

Three types of packets are exchanged between nodes: (a) status packets, (b) request packets and (c) data packets. Each node keeps track of both the status of itself and the status of its links. Status information may be periodically exchanged between two nodes (say, nodes $n_a$ and $n_b$) by status packets, which include:

(a) the data packets that node $n_a$ have already received;
(b) information for $n_b$ to measure the loss rate of the traffic between nodes $n_a$ and $n_b$ (For example, the amount of data that node $n_a$ has received from node $n_b$ and the amount of the data that node $n_a$ has sent to node $n_b$ within a predetermined time period. Node $n_b$ may obtain the loss rate based on comparing the amount of data actually received by node $n_a$ and the amount of data sent by node $n_b$);

(c) the sending and receiving capacities of the node; and (d) the number of requests currently in the request queue.

The status packet may be exchanged between any pair of connected nodes from time to time. Other mechanisms for measuring a loss rate may be used. For example, using consecutive, non-decreasing sequence numbers allow the recipient to detect packet loss. The detected loss rate may be reported to the sender.

A request packet may include (a) the packet ID that is requested; and (b) a sequence number of the request. If the packets are delivered by an unreliable protocol (e.g., UDP), duplicate packets may be generated during the transmission. The sequence number avoids replying to the same request multiple times.

A data packet includes (a) a packet ID; (b) the size of the data segment that relates to the data packet; (b) the size of the data content in the data packet; and (c) the payload (i.e., the content of the data packet).

Three kinds of packets can be packed into a transmission packet to reduce the transmission overhead. For example, a status packet and two request packets and one data packet may be packed into a UDP packet. If such packing is used, a header is required to indicate its contents.

A node assigns a sequence number to each packet it sends out. The node may use different sets of sequence numbers for different neighbors. Data packets between nodes (say, from node $n_a$ to node $n_b$) may further include (a) S, the sequence number of the transmission packet; (b) $S_r$, the newest sequence number of the received packets from $n_b$ to node $n_a$; and (c) $T_d$, the time delay from the time that the packet with the newest sequence number $S_r$ is received to the time that the present packet is sent. When node $n_a$ sends a packet to node $n_b$, node $n_a$ keeps track of the sequence number of the packet and the time the packet is sent. When node $n_a$ receives a packet from node $n_b$, the total time from the packet with sequence number $S_r$ to the time when the packet from $n_b$ is received is derived, less time $T_d$, allows the round-trip time for data transmission to be calculated.

A node may estimate its sending and receiving capacities from its loss rate and the actual bandwidth of its data traffic. A node can estimate an upper bound of its sending bandwidth capacity by monitoring the average loss rate of its outgoing traffic. If the loss rate is too great, the total outgoing bandwidth of the actual data traffic is greater than the sending bandwidth capacity of the node. A node may also estimate a lower bound of its sending bandwidth capacity from the total data bandwidth that is received by all of its neighbors. Such estimations may be performed adaptively. When a node finds that the average loss rate is higher than a given threshold, it decreases its estimate of its sending bandwidth capacity. If the average loss rate is lower than a certain threshold, it increases its estimate of its sending bandwidth capacity. To avoid oscillation during the adaptation process, the estimated value is changed slowly. The actual change rate can be determined experimentally.

For more efficient measurements, testing packets may be used to supplement the actual data traffic, when the actual data traffic is not enough to detect the sending bandwidth capacity of the node. Receiving bandwidth may be estimated in a similar way.

A node may regulate its data traffic based on its known or estimated bandwidth. Numerous methods may be used. For example, a node can use a leaky bucket to regulate the out-going packets. New tokens are generated and put into the leaky bucket according to the rate of the estimated (or known) sending bandwidth capacity. If the total number of tokens in the bucket is greater than a given threshold, the bucket leaks and thus the number of tokens in the bucket does not increase in proportion to their generation. Before a node sends a packet, the node checks if there are enough tokens in the bucket (hence, output bandwidth) to send the packet. If there are, the packet is sent and a corresponding number of tokens are removed from the bucket.

Alternatively, the average bandwidth of outgoing traffic may be used. A packet is sent when the average bandwidth is less than the estimated or known sending bandwidth capacity of the node. The incoming traffic may be regulated in a similar manner by regulating data requests from the node.

In one embodiment, three different priorities for data traffic are used under the request-replay data transfer mechanism: the group priority, the root distance priority and the link status priority. Group priority favors fast data multiplying. The group priority gives priority to a request or reply according to the group numbers of the requester, the replier and the requested packet. Group priority may be given to (a) the request for packets with the same group number (or a packet that can be used to derive the packet with the same group number) as the requesting node; or (b) the request for packets with the same group number (or a packet that can be used to derive the packet with the same group number) as the nodes receiving the request. These group priorities may be weighted equally. Requests that satisfy both criteria may be given the highest priority.

Root distance priority may be given to backward traffic. Root distance priority gives priority of requests according to the root distances of the requested node and the requesting node. The root distance priority may be given to (a) requests from nodes at smaller root distances; or (b) requests to nodes with longer root distances.

The link status priority is given according to the link status of the links with the node's neighbors. Link status priority is given to (a) requests to or from neighbors with shorter round trip time; (b) requests to or from neighbors with a lesser loss rate; (c) requests to the neighbors with larger available output capacity; and (d) requests from neighbors with a larger available input capacity.

In one embodiment, root distance priority, group priority and link status priority are considered in order. Many other priority schemes are also possible. Priority schemes may be implemented as a set of requirements. Some priorities may be used for a threshold determination (e.g., the priority requirements must be satisfied before other priorities may be considered.) Various priorities schemes may be used simultaneously, but given different weights.

Each node may keep a queue of the received requests. If the queue is longer than some predetermined length, the requests with the lowest priorities may be removed from the queue. As discussed above, data traffic relating to the link-driven transmission system may be given priority over data traffic relating to the request-driven transmission system.

A node sends a request when it has enough receiving capacity to receive the reply to the request. When a node requests a packet, it may also check (a) for the nodes that are likely to have enough sending capacity to provide the reply to the request in the near future, and (b) the length of its request queue. For example, if the ratio between the number of requests in the queue and the sending capacity of a neighbor is greater than a predetermined threshold, the node is considered to have enough capacity to reply the request. The requesting node may also put thresholds on the round trip time and the loss rate. The node then tries to find the data packets it requires from qualified neighbors (i.e., the neighboring nodes that are likely to provide a reply to the request). The requests may be sent out according to priorities assigned to the packets. As discussed above, the packets may be prioritized according to group number, root distance of the potential replier, and link status.

Normally it takes O(log(N)) number of retransmissions for a data packet to be received by every one of the N player nodes in the system. If a node loses a packet, the packet may be recovered quickly from the node's neighbors. Hence, data is reliably delivered to many nodes at low latency. When nodes are added or removed from the data delivery network, because of the balanced in-link and out-link bandwidths of the nodes, sufficient in-link and out-link data bandwidths are ensured. Since the link operations for adding or removing a node is limited by a constant, the bandwidth required by the controller for sending link-packets relating to adding and removing nodes is also limited by a constant. The controller is therefore scalable to support a large number of nodes. As the system may operate even when each node is limited to the self-sustained bandwidth, the system has the highest possible bandwidth efficiency.

Based on the technologies discussed above, one implementation of a data delivery system may be built over the Internet to deliver real-time video to multiple users. For example, it may be used to broadcast a college football game over the Internet. As discussed above, such a system may include a central controller, a data source, many user computers and a public web site. Except for web site access, all data packets in the system may be delivered using the UDP protocol. The controller may be a computer running a version of the Windows operating system, and the controller may be accessed over the Internet using its IP address, which is known. The controller computer sends and receives standard UDP packets to and from other computers on the Internet through its Internet connection.

The data source may also include a computer running an operating system (e.g., the Windows operating system) and a digital video source. The digital video source may be, for example, a camera that is connected to the computer and a video capture and encoding software to capture the video signal from the camera and to compress the video signal into data streams of constant bandwidths (e.g., a 250K bit per second content bandwidth). The digital video source should provide an interface such that other software can access the compressed data stream. For example, some capture and encoding software provides an HTTP interface for the software to access the data stream. The data source computer should also be connected to the Internet with an upload capacity of at least 300K bit per second. Note that the upload capacity is slightly larger than the content bandwidth to allow for implementing redundancy. The data source computer may run data-source software to deliver the data stream to the users. The data-source software from time to time, or periodically (for example, every 0.2 second), puts the compressed video data obtained from the video source into a buffer. Then the data in the data buffer is divided into data segments and into data packets in the manner discussed above. In one implementation, the data segments are divided into 4 groups and then divided into data packets. The length of each data packet should be less than 1400 bytes for a conventional UDP packet delivered under a conventional UDP protocol. The header of the data packet may include the length, the segment number and the group number of the packet.

The data-source software sends to the controller a root-register packet with appropriate meta data, using the controller's address obtainable from the public website. Thereafter, non-root nodes may join the data delivery network. The data source should also publish on the public web site descriptions relating to the video content and the decoding requirements.

The player nodes may include computers on the Internet running appropriate operating systems (e.g., versions of the Windows operating system). A player node should have compatible decoding software (e.g., video decoder). For a video application, each player node may be required to have 300K bit per second upload and download capacities for sending and receiving data on the Internet. Note that the capacity is slightly larger than the content bandwidth due to implementing redundancy.

When a player node wishes to receive the data (e.g., watch the video), the player node connects the controller's address from the public web page and performs the register process described above. The controller then integrates the player node into the graph in its database using the techniques and sends link-packets to all the affected player nodes, as described above. Upon receiving the link-packets, the nodes, including the root node, exchange data packets with each other. As discussed above, the nodes measure data traffic bandwidths, round trip times, loss rates of their links, and estimate their bandwidth capacities. The resulting information is exchanged among the nodes as status information in status packet.

A player node buffers its received data packets for reconstruction of the data segments of these data packets. The reconstructed data segments, (e.g., video data) may be processed by such software as a video decoder. As the player node samples periodically (e.g., every 0.2 seconds) its available sending and receiving capacities, data requests may be sent or received when adequate sending and receiving capacities for these requests are available.

During this time, player nodes join and leave the data delivery system by registering or deregistering with the controller. Similarly, when the root node leaves, the controller removes all nodes from the network. The nodes and the controller detect both the nodes that disconnect from the data delivery network unannounced and the nodes without sufficient bandwidth. Such nodes are removed from the network or otherwise properly handled by the controller.

Alternatively, in a distributed implementation (i.e., an implementation without a central controller), the nodes exchange information with each other to construct and maintain the graph of the data delivery system dynamically.

As discussed above, nodes and packets are assigned to groups. Group assignment may be random with equal probability for each group.

The root distance of a node is the average number of links that a packet in the same group as the node has to travel before the packet reaches the node. A "Number Of Nodes Tag" (NONT) may be provided on each packet to keep track of the number of nodes from which the packet has been sent. When the root node sends out the packet, the NONT of the packet is initialized to 1. Thereafter, as each node sends the packet to another node, the NONT of the packet is increased by 1. If a packet is derived from a set of packets using error correction codes, the NONT of the newly generated packet is given the largest value of the NONTs of the component packets in the set. Each node calculates its root distance by the average value of NONT of the packets it receives over time. This average value can be a weighted average with the more recent NONT values given greater weights. For example, a fading average or a moving average may be used for this purpose.

Each player node has a fixed number of connection slots. Typically, the number of connection slots can be set to several times (e.g., between 2 and 4) of the number of data groups that is required to recover the data content. About a half of the connection slots are connected to nodes in the same group as the node and the rest are connected nodes in different groups. If a player node is not connected to enough groups, the player node may seek appropriate connections with other player nodes. Each player node tries to connect to other player nodes of lower root distances. Among candidate nodes of the appropriate group affiliations, a player node selects for connection the candidate player node with the smallest root distance.

A node will disconnect from a link if the total communication bandwidth in both directions on the link is less than a certain threshold. When a node is not receiving enough data from all its connected nodes, the connected node providing the least amount of data is disconnected, so that another node with a higher sending capacity may be found.

In a system that is not centrally controlled, because the connections between the nodes change frequently, a link-driven data transmission system may be difficult to implement. In such a system, the request-driven data transmission scheme is preferred for simplicity. The priority scheme for a pure request-driven data transmission system has a greater impact on performance. The group priority and the root distance priority compete with each other. If the group priority is favored over root distance priority, bandwidth capacity for backward traffic may become insufficient. If the root distance priority is favored over the group priority, bandwidth capacity left for data multiplying may become insufficient. Thus, a balance between these competing priority schemes is essential to accommodate both data multiplying and backward traffic. For example, the two priority schemes can rotate as the favored priority scheme, exchanging their positions at predetermined time intervals.

Note that the player nodes seek connections with other nodes of shorter root distances, nodes with similar root distances tend to connect with each other. Consequently, fast backward traffic is likely to occur.

Another priority scheme is traffic priority which favors data traffic on links with higher traffic. This priority scheme concentrates communication on the good links.

Nodes seeking to connect with each other exchange connection packets, which include (a) a time-to-live field; (b) the amount of the sending and receiving capacities of the sending node; (c) the current actual sending bandwidth and receiving bandwidth of the node; (d) the root distance of the node; (e) the group number of the node; (f) the network address of the node (e.g., an IP address and a port number); and (f) information of other connected nodes. including their root distances and the network addresses.

Each node sends out connection packets to its neighbors periodically. When a connection packet is first sent out, the time-to-live field is set to a predetermined number. When a node receives a connection packet, it decreases the time-to-live field by one. When the time-to-live field is not zero, the node forwards the packet to a neighbor. The time-to-live field thus controls the distance the connection packet may travel and the number of nodes that can receive it. For example, if the time-to-live field is set to 2, the direct neighbors of a node and their direct neighbors are within the scope the connection packet.

The connection packet can also be sent upon inquiry. When a node fails to does not find an appropriate node to connect to, the node may send an inquiry packet to other nodes to request a connection packet.

In a distributed data delivery system, an entry point may be provided for new nodes seeking to join the data delivery network. The address of the entry point may be made publicly known. The entry point keeps track nodes in the network by keeping a list of recently joined nodes, and by listening to the connection status packets from the nodes. In the latter case, the entry point acts as a special node in the network. The entry point can be implemented together with the data source. When a new node joins the network, the new node obtains from the entry point a set of nodes to seek connections. The process of contacting the entry point is similar to the registration process of the centrally controlled network. An authorization procedure is carried out to ensure that only authorized nodes are allowed on the network.

A root node in a distributed system may be set up similar to the system with a central controller.

The above detailed description is provided to illustrate specific embodiments of the present invention and is not intended to be limiting. Numerous variations and modifications within the scope of the invention are possible. The present invention is set forth in the accompanying claims.

I claim:

1. A data processing network having a data source originating data that is divided into a plurality of data packets to be distributed throughout the data processing network, comprising a plurality of processors each being assigned to one of a plurality of groups, each processor having (i) a number of in-links connected to other processors over which the processor receives the data packets and (ii) a number of out-links over which the processor provides the data packets it has received to other processors; wherein the data processing network includes a new processor not already included in the plurality of processors by:
   (i) assigning the new processor to one of the groups; and
   (ii) connecting an in-link or an out-link of the new processor to (a) the data source or (b) a first processor of the assigned group, wherein the first processor is selected for being connected to, among the processors of the assigned group at the time of selection, the least number of other processors within the assigned group.

2. The data processing network of claim 1, wherein (i) each processor is associated with a root distance from the data source, the root distance being, among the root distances associated with the processors connected to the processor by the processor's in-links, the least one of such root distances plus one, the root distance of the data source being zero; (ii) the data source associates each data packet with one of the groups and provides the data packets according to its assign group to one or more processors of the same group having a root distance of one; and (iii) each processor provides through its out-links the data packets of the processor's group to other processors associated with the processor's group.

3. The data processing network of claim 2, wherein each processor, having less than the maximum root distance in the data processing network, has an in-link connected to another processor of a root distance greater than the processor's root distance.

4. The data processing network of claim 2, wherein including the new processor further comprises:
   (i) determining a root distance to be associated with the new processor; and (ii) connecting an in-link or an out-link of the new processor to a second processor that is associated with a root distance less than the root distance associated with the new processor.

5. The data processing network of claim 1, wherein the new processor is assigned to a group having, among the groups of the processors, the least number of processors.

6. The data processing network of claim 2, wherein the first processor is associated with the least root distance among processors in the same group.

7. The data processing network of claim 6, wherein connecting an in-link or an out-link of the new processor to the second processor further comprises disconnecting an in-link or an out-link between the first processor and the second processor.

8. The data processing network of claim 1, wherein the processors of the data processing network satisfy an in-link rule which determines whether or not an in-link of a processor in a first group can be connected to a processor of a second group different from the first group.

9. The data processing network of claim 1, wherein the data processing network is reconfigured using a step that removes a processor from a group having the largest number of processors among the groups and wherein the processor removed is associated with the greatest root distance among the processors within its group.

10. The data processing network of claim 9, wherein the data processing network is reconfigured using a step that swaps the processor removed with a second processor.

11. The data processing network of claim 9, wherein the reconfigured data processing network satisfies a criterion that requires that a difference between the root distances of any two processors in the reconfigured data processing network be greater than a specified value.

12. The data processing network of claim 1, wherein the in-links of each processor is connected to two or more other processors.

13. The data processing network of claim 1, further comprising a controller that maintains a connectivity of the data processing network.

14. The data processing network of claim 1, wherein the data being distributed comprises broadcast video data.

15. The data processing network of claim 1, wherein each processor provides through its out-links the data packets of the processor's group to one or more processors of a group other than the processor's group.

16. The data processing network of claim 1, wherein each processor in the data processing network is required to have an input bandwidth and an output bandwidth that are (a) both greater than a performance-based bandwidth value and (b) no greater than a predetermined bandwidth value of each other.

17. The data processing network of claim 1, wherein each processor is connected by its in-links to processors associated with less than all groups but greater than a specified number of groups, and wherein receiving the packets associated any combination of groups associated with at least the specified number of groups is sufficient to reconstruct the data.

18. The data processing network of claim 1, wherein each processor received packets according to a link-driven protocol or a request-reply protocol.

19. In a data processing network having a data source originating data that is divided into a plurality of data packets to be distributed throughout the data processing network, a method comprising:

providing a plurality of processors each being assigned to one of a plurality of groups, each processor having (i) a number of in-links connected to other processors over which the processor receives the data packets and (ii) a number of out-links over which the processor provides the data packets it has received to other processors; and including a new processor not already included in the plurality of processors by:

(ii) assigning the new processor to one of the groups;

(ii) connecting an in-link or an out-link of the new processor to (a) the data source or (b) a first processor of the assigned group, wherein the first processor is selected for being connected to, among the processors of the assigned group at the time of selection, the least number of other processors within the assigned group.

20. The method of claim 19, further comprising:

associating each processor with a root distance from the data source, the root distance being, among the root distances associated with the processors connected to the processor by the processor's in-links, the least one of such root distances plus one, the root distance of the data source being zero;

associating each data packet with one of the groups; and providing the data packets according to its assigned group to one or more processors of the same group having a root distance of one; and providing from each processor through its out-links the data packets of the processor's group to other processors associated with the processor's group.

21. The method of claim 20, wherein each processor, having less than the maximum root distance in the data processing network, has an in-link connected to another processor of a root distance greater than the processor's root distance.

22. The method of claim 20, wherein including the new processor further comprises:

(i) determining a root distance to be associated with the new processor; and (ii) connecting an in-link or an out-link of the new processor to a second processor that is associated with a root distance less than the root distance associated with the new processor.

23. The method of claim 22, wherein the new processor is assigned to a group having, among the groups of the processors, the least number of processors.

24. The method of claim 22, wherein the first processor is associated with the least root distance among processors in the same group.

25. The method of claim 19, wherein connecting an in-link or an out-link of the new processor to the second processor further comprises disconnecting an in-link or an out-link between the first processor and the second processor.

26. The method of claim 19, wherein the processors of the data processing network satisfy an in-link rule which determines whether or not an in-link of a processor in a first group can be connected to a processor of a second group different from the first group.

27. The method of claim 19, wherein the data processing network is reconfigured using a step that removes a processor from a group having the largest number of processors among the groups and wherein the processor removed is associated with the greatest root distance among the processors within its group.

28. The method of claim 27, wherein the data processing network is reconfigured using a step that swaps the processor removed with a second processor.

29. The method of claim 27, wherein the reconfigured data processing network satisfies a criterion that requires that a difference between the root distances of any two processors in the reconfigured data processing network be greater than a specified value.

30. The method of claim 19, wherein the in-links of each processor is connected to two or more other processors.

31. The method of claim 19, further comprising a controller that maintains a connectivity of the data processing network.

32. The method of claim 19, wherein the data being distributed comprises broadcast video data.

33. The method of claim 19, wherein each processor provides through its out-links the packets of the processor's group to one or more processors of a group other than the processor's group.

34. The method of claim 19, wherein each processor in the data processing network is required to have an input bandwidth and an output bandwidth that are (a) both greater than a performance-based bandwidth value and (b) no greater than a predetermined bandwidth value of each other.

35. The method of claim 19, wherein each processor received packets according to a link-driven protocol or a request-reply protocol.

36. The method of claim 19, wherein each processor is connected by its in-links to processors associated with less than all groups but greater than a specified number of groups, and wherein receiving the packets associated any combination of groups associated with at least the specified number of groups is sufficient to reconstruct the data.

* * * * *